US006828756B2

(12) United States Patent
Kinoshita

(10) Patent No.: US 6,828,756 B2
(45) Date of Patent: Dec. 7, 2004

(54) FOLDING MOBILE COMMUNICATION TERMINAL

(75) Inventor: Masashi Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/417,780

(22) Filed: Apr. 17, 2003

(65) Prior Publication Data
US 2003/0201753 A1 Oct. 30, 2003

(30) Foreign Application Priority Data

Apr. 26, 2002 (JP) ........................................ 2002-126014

(51) Int. Cl.[7] ................................................ H02J 7/00
(52) U.S. Cl. ...................... 320/114; 439/140; 439/108; 439/137; 439/138
(58) Field of Search ............................ 320/114, 107; 439/140, 138, 137, 108

(56) References Cited

U.S. PATENT DOCUMENTS

| 4,772,214 A | * | 9/1988 | Stoegmueller | .............. 439/140 |
|---|---|---|---|---|
| 5,002,495 A | * | 3/1991 | Tanaka | ......................... 439/108 |
| 5,841,632 A | * | 11/1998 | Horii et al. | .................. 361/686 |
| 5,982,884 A | * | 11/1999 | Hoffmann | .................... 379/446 |
| 6,183,274 B1 | * | 2/2001 | Allum | ......................... 439/135 |
| 6,346,793 B1 | * | 2/2002 | Shibata et al. | ............... 320/113 |

FOREIGN PATENT DOCUMENTS

DE    198 02 552 A1  *  9/1998

* cited by examiner

Primary Examiner—Lawrence Luk
(74) Attorney, Agent, or Firm—Scully, Scott, Murphy & Presser

(57) ABSTRACT

A folding mobile communication terminal is provided with a contact for charging and a protective cover that covers the contact. The protective cover is connected to a coil spring and is movable. When the communication terminal is installed on a battery charger, the protective cover is pushed up by a convex portion of the battery charger, exposes the contact and enables the connection of the contact and a terminal of the battery charger. When the communication terminal is detached from the battery charger, the protective cover is returned to a position in which the protective cover covers the contact by the resilience of the coil spring.

2 Claims, 4 Drawing Sheets

FOLDING MOBILE COMMUNICATION TERMINAL

BACKGROUND OF THE INVENTION

1. Field of the Invention

The present invention relates to a mobile communication terminal, particularly relates to a folding mobile communication terminal provided with a contact for charging.

2. Description of the Related Prior Art

For example, a communication terminal such as a mobile telephone is provided with a chargeable secondary cell and a contact for charging for connecting the secondary cell and an external battery charger. The battery charger the terminal of which is connected to the contact charges the secondary cell. Normally, the contact for charging of the communication terminal is exposed to the outside surface of the communication terminal so that the contact for charging is easily connected to a terminal of the battery charger. Therefore, the surface of the contact is easily made dirty because of sweat of a user and the humidity of outside air and when the communication terminal is used for a long term, the surface of the contact rusts. As a result, satisfactory connection between the contact and the terminal of the battery charger is disabled. Particularly, as a folding mobile communication terminal is provided with a relatively large contact for charging in the vicinity of a hinge, the surface of the contact is easily deteriorated.

SUMMARY OF THE INVENTION

A folding mobile communication terminal according to the invention is provided with a contact for connecting an external power source and a protective cover for covering the contact and the protective cover can be moved to expose the contact. The protective cover can be connected to an elastic member. For example, a coil spring is used for the elastic member and can be attached to a hinge of the terminal. The coil spring can be arranged at both ends of the hinge. When the communication terminal is installed on a battery charger, the battery charger pushes up the cover and can expose the contact. As a result, the contact of the communication terminal can be connected to a terminal of the battery charger.

The battery charger of the communication terminal is provided with the terminal for connecting to the contact of the folding mobile communication terminal, an installation part for installing the communication terminal and a convex portion formed in the vicinity of the installation part, and the convex portion pushes up the protective cover of the communication terminal installed on the installation part.

As the contact of the folding mobile communication terminal is covered with the protective cover except when the folding mobile communication terminal is charged, the surface of the contact can be prevented from being deteriorated. Besides, the battery charger can easily connect the contact of the communication terminal and the terminal of the battery charger.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
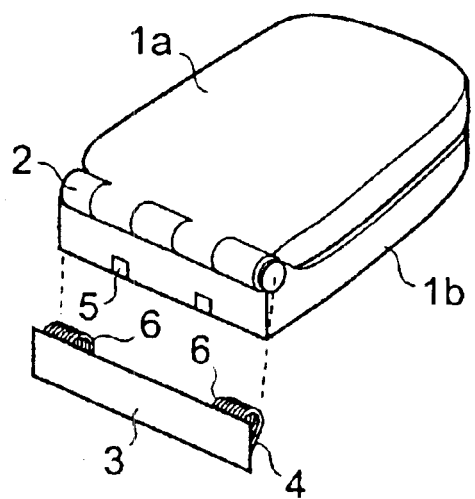
FIG. 1 is a perspective view showing an embodiment of a folding mobile communication terminal according to the invention in which a protective cover and the body of the terminal are separated.

As shown in FIG. 1, an embodiment of a folding mobile communication terminal is provided with an upper body 1a having a display, a lower body 1b in which a secondary cell is installed, a hinge 2 that couples the two bodies so that they can be turned, a contact 5 provided in the vicinity of the hinge 2, a pair of coil springs 6 connected to the hinge 2, an arm 4 connected to the coil spring 6 and a protective cover 3 connected to the arm 4. A shaft of the hinge 2 is inserted into the coil spring 6 and one end of the coil spring 6 is fixed to a predetermined position of the hinge 2. The arm 4 is a part of the coil spring 6, is protruded from the body of the communication terminal and is connected to the protective cover 3.

Figure 2:
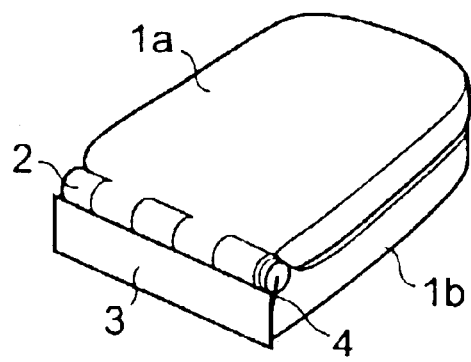
FIG. 2 is a perspective view showing the embodiment of the folding mobile communication terminal according to the invention.
Figure 3:
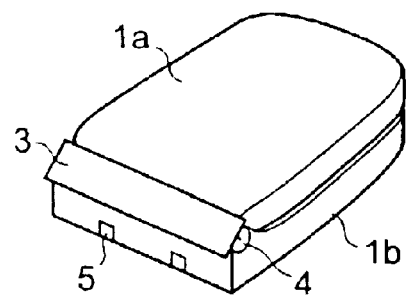
FIG. 3 is a perspective view showing the embodiment of the folding mobile communication terminal according to the invention.

As shown in FIG. 2, in an initial state, the arm 4 of the coil spring 6 is arranged in a position in which the protective cover 3 covers the contact 5. As shown in FIG. 3, the protective cover 3 is pushed up when the communication terminal is installed on the battery charger for example and the contact 5 is exposed. When the communication terminal is detached from the battery charger, the arm 4 is turned by the resilience of the coil spring 6 and the protective cover 3 is returned to the initial position shown in FIG. 2 again.

Figures 4A, 4B:
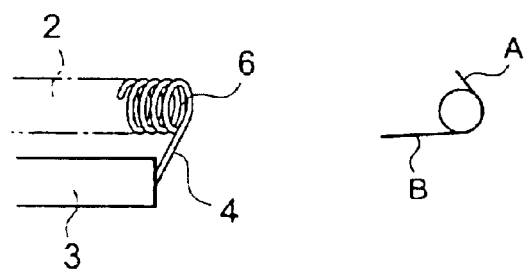
FIG. 4a is a perspective view showing a coil spring and the protective cover when the protective cover covers a contact and FIG. 4b is a sectional view showing the coil spring when the protective cover covers the contact.
Figures 5A, 5B:
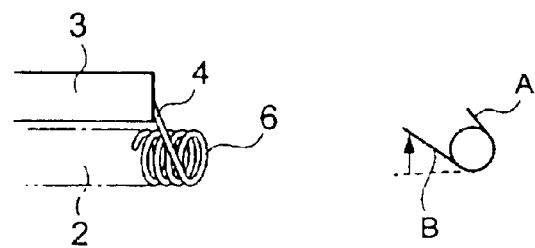
FIG. 5a is a perspective view showing the coil spring and the protective cover when the contact is exposed and FIG. 5b is a sectional view showing the coil spring when the contact is exposed.

FIGS. 4a and 4b show the details of the coil spring 6. The coil spring 6 is attached to the hinge 2. One end of the coil spring 6 functions as the arm 4 equivalent to a part B in FIG. 4b and the arm 4 is connected to the protective cover 3. The other end equivalent to a part A in FIG. 4b of the coil spring 6 is fixed to the hinge 2 or the vicinity. FIGS. 5a and 5B show a state in which the protective cover 3 is pushed up. The arm 4 and the coil spring 6 connected to the protective cover 3 are turned and resilience is stored in the coil spring 6. In this embodiment, the arm 4 equivalent to the part B shown in FIG. 5b is adjusted so that the arm 4 can be turned from the initial position to an angle of approximately 60 degrees. The cover 3 can be returned to the initial position by the resilience of the coil spring 6. The coil spring 6 may be made of stainless steel for example.

Figure 6:
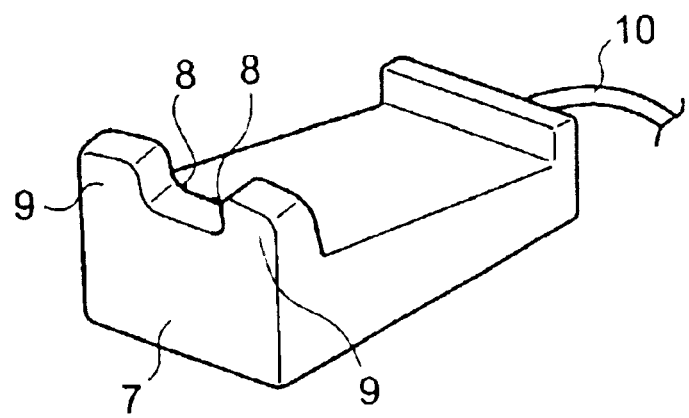
FIG. 6 is a perspective view showing a concrete example of a battery charger.
Figure 7:
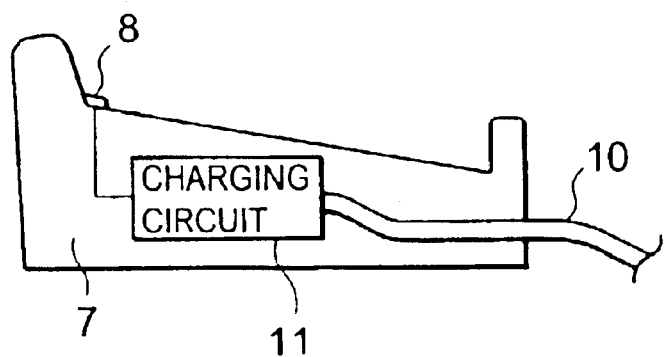
FIG. 7 is a sectional view showing the concrete example of the battery charger.

FIGS. 6 and 7 show an example of a battery charger 7 of the folding mobile communication terminal. The battery charger 7 is provided with a power supply cable 10, a charging circuit 11 and a terminal 8 connected to the contact 5. Further, the battery charger 7 is provided with a communication terminal installation part and two convex portions 9. These two convex portions 9 are formed in positions in which they meet the protective cover 3 when the folding mobile communication terminal is installed on the terminal installation part.

Figure 8:
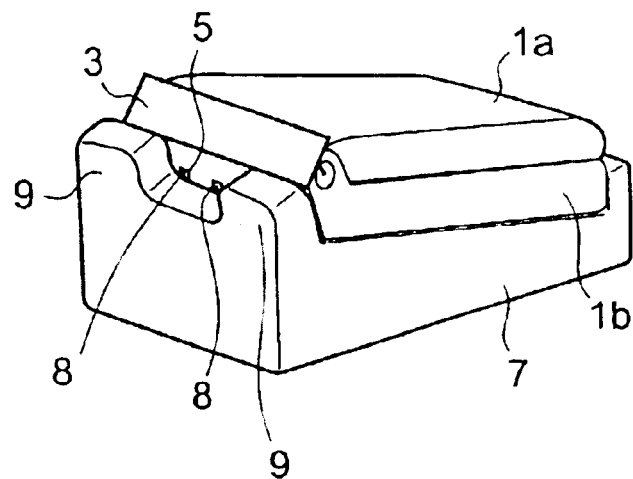
FIG. 8 is a perspective view showing the concrete example of the battery charger on which the folding mobile communication terminal is installed.
Figure 9:
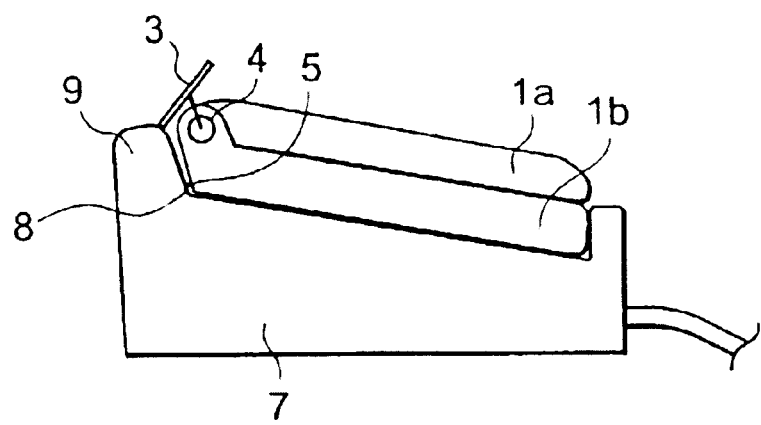
FIG. 9 is a side view showing the concrete example of the battery charger on which the folding mobile communication terminal is installed.

FIGS. 8 and 9 show the folding mobile communication terminal installed on the battery charger 7. The folding mobile communication terminal is installed on the battery charger 7 in a state in which the upper body 1a and the lower body 1b are folded. At this time, the convex portions 9 of the battery charger 7 meet the protective cover 3 of the communication terminal and push up the protective cover 3. Afterward, the exposed contact 5 and the terminal 8 of the battery charger 7 are connected and charging is made. When charging is finished and the communication terminal is detached from the battery charger 7, the protective cover 3 is returned in the initial position by the resilience of the coil spring 6 and covers the contact 5.

In place of the coil spring 6, a plate spring or a bar spring that generates resilience by bending the spring can be used. At this time, one end of the spring is connected to the protective cover 3 and the other end is fixed to a predetermined position in the vicinity of the hinge 2.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A folding mobile communication terminal comprising:

an upper body;

a lower body;

a hinge for coupling the bodies;

a charging contact disposed in the vicinity of the hinge;

a coil spring that is connected to the hinge; and a protective cover for covering the charging contact, wherein:

the protective cover is operatively connected to the coil spring and rotates around an axis of the hinge to expose the charging contact when the communication terminal is installed on a battery charger.

2. A battery charger of a folding mobile communication terminal comprising:

a terminal for connecting to a contact of the folding mobile communication terminal;

an installation part for installing the folding mobile communication terminal; and a convex portion formed in the vicinity of the installation part, wherein:

the convex portion rotates a protective cover of the folding mobile communication terminal installed on the installation part to expose the contact of the folding mobile communication terminal.

* * * * *